United States Patent
de Bonfim Gripp et al.

(10) Patent No.: US 11,024,020 B2
(45) Date of Patent: Jun. 1, 2021

(54) METHOD AND SYSTEM FOR AUTOMATIC QUALITY INSPECTION OF MATERIALS AND VIRTUAL MATERIAL SURFACES

(71) Applicant: AUTAZA TECNOLOGIA S.A., Sao Jose dos Campos (BR)

(72) Inventors: Jorge Augusto de Bonfim Gripp, Saó José dos Campos (BR); Enivaldo Amaral de Souza, Jacarei (BR); Renan Padovani, Saó José dos Campos (BR); Carlos Yuji Sakuramoto, Rio de Janeiro (BR)

(73) Assignee: Autaza Tecnologia S.A., Sao Jose dos Campos (BR)

( * ) Notice: Subject to any disclaimer, the term of this patent is extended or adjusted under 35 U.S.C. 154(b) by 50 days.

(21) Appl. No.: 16/428,393

(22) Filed: May 31, 2019

(65) Prior Publication Data

US 2019/0287237 A1    Sep. 19, 2019

Related U.S. Application Data

(63) Continuation-in-part of application No. PCT/BR2017/050368, filed on Nov. 30, 2017.

(30) Foreign Application Priority Data

Dec. 1, 2016   (BR) .................. 102016028266-7

(51) Int. Cl.
   *G06T 7/64*    (2017.01)
   *G06T 7/00*    (2017.01)
   (Continued)

(52) U.S. Cl.
   CPC ............ *G06T 7/0004* (2013.01); *G01B 11/30* (2013.01); *G01N 21/55* (2013.01); *G01N 21/88* (2013.01);
   (Continued)

(58) Field of Classification Search
   CPC ......... G06T 7/0004; G06T 7/64; G06T 7/136; G06T 7/521; G06T 7/13; G06T 7/155;
   (Continued)

(56) References Cited

U.S. PATENT DOCUMENTS

| 4,920,385 A | 4/1990 | Clarke et al. |
| 5,216,481 A | 6/1993 | Minato |

(Continued)

FOREIGN PATENT DOCUMENTS

JP    05-164696 A    6/1993

OTHER PUBLICATIONS

International Written Opinion for International Application No. PCT/BR2017/050368 dated Feb. 15, 2018, 4 pages.

(Continued)

*Primary Examiner* — Gregory M Desire
(74) *Attorney, Agent, or Firm* — TraskBritt

(57) ABSTRACT

The present document describes methods and systems for the automatic inspection of material quality. A set of lights with a geometric pattern is cast on a material to be analyzed. Depending on the material being inspected, same may act as a mirror and the reflected image is captured by a capture device, or the light passes through the material being inspected and the image is captured by a capture device. Defects in the material can be detected by the distortion caused by same in the pattern of the reflected image or passing through. Finally, software is used to identify and locate these distortions, and consequently the defects in the material. This classification of defects is carried out using artificial intelligence techniques.

20 Claims, 7 Drawing Sheets

(51) Int. Cl.
  *G06T 7/521* (2017.01)
  *G01N 21/55* (2014.01)
  *G06T 7/136* (2017.01)
  *G01N 21/88* (2006.01)
  *G06T 7/155* (2017.01)
  *G06T 5/30* (2006.01)
  *G06T 7/13* (2017.01)
  *G01B 11/30* (2006.01)

(52) U.S. Cl.
  CPC .................. *G06T 5/30* (2013.01); *G06T 7/00* (2013.01); *G06T 7/13* (2017.01); *G06T 7/136* (2017.01); *G06T 7/155* (2017.01); *G06T 7/521* (2017.01); *G06T 7/64* (2017.01); *G06T 2207/10004* (2013.01); *G06T 2207/20084* (2013.01)

(58) Field of Classification Search
  CPC .. G06T 7/00; G06T 5/30; G01B 11/30; G01N 21/55; G01N 21/88
  See application file for complete search history.

(56) References Cited

U.S. PATENT DOCUMENTS

| | | |
|---|---|---|
| 5,307,152 A | 4/1994 | Boehnlein et al. |
| 6,639,685 B1 | 10/2003 | Gu et al. |
| 6,738,507 B2 | 5/2004 | Liasi et al. |
| 6,759,655 B2 * | 7/2004 | Nara ................. G03F 7/70616 250/307 |
| 7,962,303 B2 | 6/2011 | Oue et al. |
| 8,126,255 B2 * | 2/2012 | Bhaskar ................. G06T 7/001 382/141 |
| 8,139,841 B2 * | 3/2012 | Shibuya ............... G06T 7/0004 382/141 |
| 8,144,970 B2 * | 3/2012 | Miyashita ........... G03F 7/70641 382/145 |
| 9,063,093 B2 * | 6/2015 | Hatsuda ............. G01N 21/8851 |
| 9,551,671 B2 * | 1/2017 | Colle ................... G01N 21/90 |
| 9,816,939 B2 * | 11/2017 | Duffy ..................... H01J 37/28 |
| 10,607,119 B2 * | 3/2020 | He ....................... G06K 9/6267 |
| 2003/0007677 A1 * | 1/2003 | Hiroi ..................... G06T 7/001 382/149 |
| 2007/0206182 A1 | 9/2007 | Ishikawa et al. |
| 2012/0133913 A1 * | 5/2012 | Okita ................. G03F 7/70525 355/30 |
| 2014/0268105 A1 * | 9/2014 | Bills ..................... G01N 21/453 356/51 |
| 2015/0130927 A1 | 5/2015 | Luxen et al. |
| 2016/0284075 A1 * | 9/2016 | Phan ................... G06K 9/00664 |
| 2019/0287237 A1 * | 9/2019 | de Bonfim Gripp ... G06T 7/136 |

OTHER PUBLICATIONS

International Search Report for International Application No. PCT/BR2017/050368 dated Feb. 15, 2018, 3 pages.

* cited by examiner

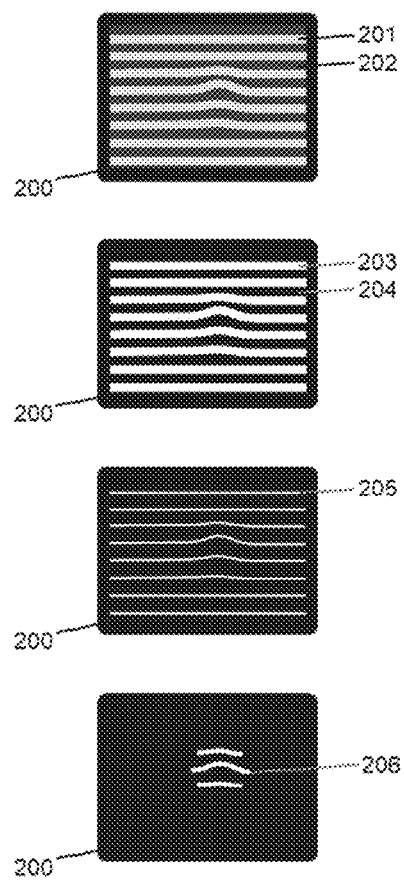
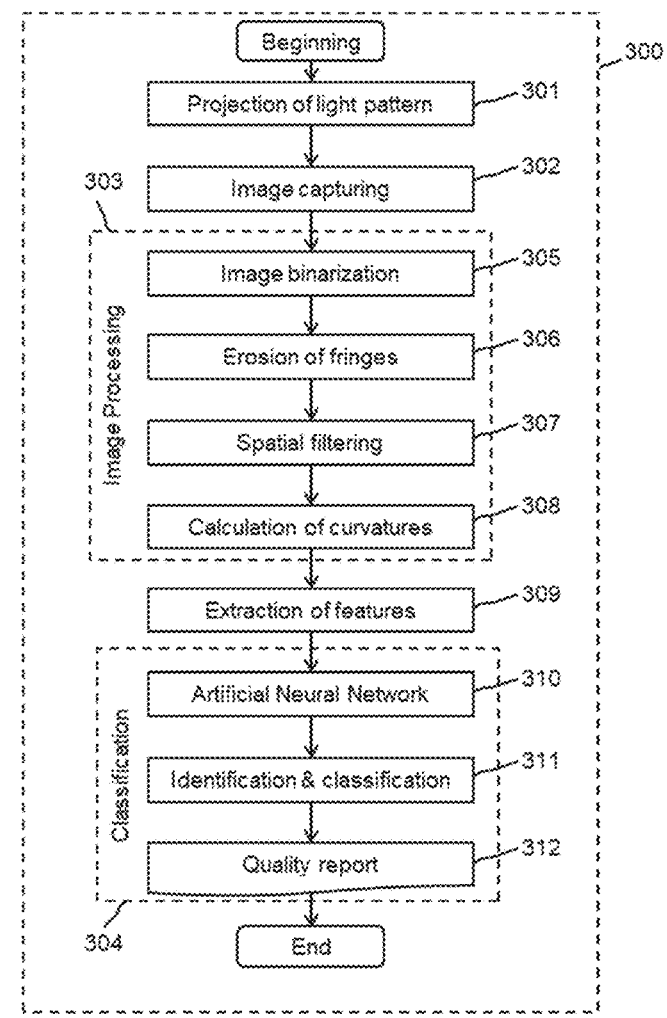
Fig. 2
Fig. 3A

METHOD AND SYSTEM FOR AUTOMATIC QUALITY INSPECTION OF MATERIALS AND VIRTUAL MATERIAL SURFACES

CROSS-REFERENCE TO RELATED APPLICATIONS

This application is a continuation-in-part of International Patent Application PCT/BR2017/050368, filed Nov. 30, 2017, designating the United States of America and published in Portuguese as International Patent Publication WO 2018/098551 A1 on Jun. 7, 2018, which claims the benefit under Article 8 of the Patent Cooperation Treaty to Brazilian Patent Application Serial No. 102016028266-7, filed Dec. 1, 2016.

TECHNICAL FIELD

The present application relates to methods and systems for automatic quality inspection of materials and virtual material surfaces. The methods and systems described herein may be used in the quality inspection of a wide range of products, for example packaging, glasses, crystals, metal pieces, plastic pieces, resin pieces, polymer pieces, ceramic pieces, composite pieces, glass pieces, crystal pieces, mixtures of the same and the like. As such, the methods and systems described herein may be used in the quality inspection of vehicles, such as bicycles, motor vehicles (motorcycles, cars, trucks, buses), railed vehicles (trains, trams), watercraft (ships, boats), amphibious vehicles (screw-propelled vehicle, hovercraft), aircraft (airplanes, helicopters) and spacecraft.

BACKGROUND

The external quality of a product is the first impression that can motivate a customer to acquire it or not. Hence, a high quality body surface, for example, is a competitive advantage in the automotive industry. Likewise, the quality of transparent or translucid materials, like glasses or crystals, is critical to its market value.

For example, the manufacture of a vehicle body, chassis or fairing, has several steps, such as stamping, hemming, welding, painting and final assembly. In the stamping process, flat steel sheets slightly less than 1 millimeter thick are formed in a press between a lower and an upper die, the latter falls on the plate and exerts the force of several tons. In the process of stamping a door or fender, for example, presses are lined up, each performing operations such as forming, bending, cutting and folding, so that a new body part is produced at the end of the sequence of operations. Hemming is the process of bending and folding the borders of an outer panel over the interior for the closing of hoods, doors or rear covers. The joining of the stamped parts is usually carried out by spot welding to create the bodywork, which passes through a few layers of paint and through ovens for drying.

The manufactured parts are submitted to a strict quality control, in order to guarantee the uniformity in the manufacture and the fidelity with the designed model. Such quality control aims to ensure not only the perfect coupling between the parts to assemble the product in each of the following stages, but also a high quality finish of the body that satisfies the expectations of the customers.

The methods and systems described herein focus on the material surface quality, which should not have imperfections, such as waviness, undulations or undesirable markings.

Currently, the method of material surface quality inspection is carried out visually, by a trained inspector, for identifying and classifying defects. Such defects are better observed if the material surface reflects the light specularly, i.e., as a mirror. In order to have such specular reflection, similar to a mirror, the metal surface is usually covered by a thin layer of reflective oil, especially for inspecting materials, such as pieces, body or fairing parts immediately after being stamped or painted, for example during inspection of the vehicle body, or fairing, at the end of the assembly line. The light source usually has a known geometric pattern, for example, parallel lines composed of equally spaced tubular lamps. If the surface exhibits undesirable undulation, the pattern of reflected light lines in the material is distorted. Defects may be classified according to their level of severity and the source of the error, for example, tool mark, low dent, high bump, wrinkle or waviness. Besides being an intense and repetitive work, this method is subject to the subjectivity of the inspector's evaluation. Such procedures used for the acquisition of topographic information on specular surfaces through analysis of a known reflected light pattern is known as deflectometry.

Common systems for geometric analysis are the three-dimensional scanners, or 3D scanners, such as that disclosed in U.S. Pat. No. 6,738,507 B2, which uses a set of lasers or monochromatic lights to reconstruct in computer the topology of a measured piece. Such measurement has a grid of points separated by approximately 60 micrometers and can be compared with the CAD (computer aided design) dimensions of the piece design. In such 3D reconstruction technique, the piece is originally matte or is painted with a white matte powder so that the laser of the equipment is reflected diffusely by the piece, unlike the methods and systems described herein where light is reflected by or distorted through the inspected material. The dimensional control of parts through the 3D scanner focuses on the variation between the measured height and the projected height of the piece. The height variation is not the most sensitive unit for detecting surface undulation or waviness defects, but rather the variation of the curvature of the part (which is its second derivative). Even waviness with slight variations in height of 30 micrometers can be observed visually by an inspector when it reflects fringes of light on a piece.

Another geometric analysis system is the profile scanner, which measures the part profile line by line, as shown in U.S. Pat. No. 7,962,303 B2. This profilometer measures the profile (depth) of the piece along one line at a time. In the same way as the 3D scanner, this process demands high computational power in the construction of the three-dimensional profile. A similar problem presents the profilometer presented in U.S. Pat. No. 5,844,801 A, which has a mobile optical head for scanning the piece line by line, additionally presenting a speed limitation due to the mechanical movement of this sensor.

The technology disclosed in U.S. Pat. No. 6,639,685 B1 imparts light and dark stripes on a piece inspected for the purpose of reconstructing the three-dimensional surface thereof through the deformation of such stripes by the difference in height throughout the piece. The reflection of the stripes on the piece is made diffusely.

The object disclosed in the patent application publication U.S. 2015/0130927 A1 also features a surface inspection where stripes are projected onto a piece, which are diffusely reflected. As mentioned earlier, the variation in height perceived by the diffuse reflection of stripes on the piece is not the unit that is more sensitive for detecting surface defects, such as waviness, but rather the variation of curvature of the workpiece, which limits the precision of the techniques that use diffuse reflection.

Another technology, disclosed in U.S. Pat. No. 4,920,385 A, relates to a complex optical assembly, with movable mirrors incident on a laser beam, which is specularly reflected on the inspected material, reflected a second time in a retroreflective wall (which reflects light in the same direction of the incident ray such as 3M Scotchlight material), reflected a third time on the same inspected material and returning to a camera positioned near the source of illumination. In addition to the slightly more complex optical device, the aforementioned patent also presents the need for polarizing filters to improve the signal-to-noise ratio acquired by the camera.

Since a local defect presents small variations in height, but sudden curvature variation of the surface in a small area, deflectometry is the most accurate technique for this type of inspection. The use of a light source with equally spaced bulbs to generate a set of white fringes reflected on the part is already widely used to aid in the visual identification of surface defects by the inspectors. However, none of the above-cited prior art refer to automation of a method of capturing an image of a pattern of lights reflected or refracted by an inspected material; processing the image; extracting features from the image and, based on such features identifying and classifying material defects.

Furthermore, none of the above-cited prior art refer to methods and systems for generating a virtual material surface from which an image may be captured and processed in a virtual environment, then having features extract from the image and, based on such features identifying and classifying material defects.

BRIEF SUMMARY

Automatic methods and systems for inspecting material surfaces improve the objectivity, reproducibility, repeatability and celerity of the current processes of quality inspection of materials are disclosed and claimed herein. In one aspect, the methods and systems disclosed herein may be applied in the inspection of any reflecting, refracting or translucent (which is permeable but distorting lights) material surface, such material being metals, plastics, polymers, composites, glasses, acrylics, crystals, ceramics, and the like. In the context of the vehicle industry, for example, the claimed methods and systems provide a solution for automating the quality inspection of materials, such as pieces, body, chassis or fairing parts and surfaces, glass and internal parts of a wide range of products.

According to a possible embodiment, a light-emitting source, or light source, projects light in a defined geometric pattern on a material to be inspected. The methods and systems described herein can be applied in the inspection of totally or partially reflective, transparent or translucent materials. The material to be inspected may be reflective, i.e., reflects the light incident, or translucent, or transparent, and refracts or distorts the inciding light. In both cases, the light reflected or refracted by the material may be captured by an image-capturing device.

According to some embodiments, systems and methods are provided whereby a defect in a material can then be identified by distortions caused by the same in the pattern of the image captured by the image-capturing device. In order to automatically assess such distortions, a software can identify, locate and/or classify the defects, as well as sort the defects automatically, through an artificial intelligence process.

According to other embodiments, systems and methods are provided whereby a virtual material surface is generated in or by a software, either by design, modeling or by digitalizing a material by a three-dimensional digitalizer. Such generated image may be captured and processed virtually and a defect in a material can then be identified by distortions caused by the same in the pattern of the image captured by a virtual image-capturing device. In order to automatically assess such distortions, a software can identify, locate and/or classify the defects, as well as sort the defects automatically, through an artificial intelligence process.

The methods for automatic inspection of materials and virtual material surfaces described herein aim to inspect the quality thereof, for example by identifying, locating and/or classifying defects on the same. The methods comprise processing the basic steps of capturing or generating images, as well as detecting, identifying, locating and/or classifying defects in the inspected material using artificial intelligence techniques.

In an embodiment, the present application refers to a method for automatic inspection of materials. As previously explained, automatic inspection of materials can be useful in many industries, such as automobile industry. Basically, any kind of material can be subjected to the automatic inspection described herein, opaque materials, translucid or transparent materials; matte materials, lustrous or reflecting materials.

According to a first specific embodiment, the method for automatic inspection of materials comprises the steps of projecting a light pattern on a material to be inspected with a light source; capturing the image reflected or refracted by the material with an image capturing device; processing the captured image in a software; extracting features from the processed image with a software; and identifying, locating and/or classifying defects based on the features extracted from the image.

In a more detailed embodiment, the processed image is transformed into a binary image having 2 pixel values, and the features extracted therefrom feed a defect classification algorithm by which defects in the inspected material are identified, located and/or classified.

In another embodiment, the application refers to a method for automatic inspection of virtual material surfaces. Automatic inspection of virtual material surface can also be useful in many industries, such as automobile industry. Basically, any kind of material can be subjected to the automatic inspection described herein, opaque materials, translucid or transparent materials; matte materials, lustrous or reflecting materials.

According to such specific embodiment, real material surfaces may be digitalized with a digitalization device in order to generate a virtual material surface, which can be inspected as per the method described herein. In addition, inspection of virtual material surfaces can also be applied to virtual material surface created, designed or simulated in a software. For example, the quality of three-dimensional models generated in a virtual environment, i.e., fully created, designed or simulated in a design or modeling software, may be inspected so that unwanted undulations or any other imperfection in the virtual material surface can be detected, identified, located and/or classified. The method of automatic inspection of virtual material surfaces provides an opportunity to correct any problems yet during the car design stage, improving material quality and saving costs during manufacturing.

According to a specific embodiment, the method for automatic inspection of virtual material surfaces comprises the steps of generating a virtual material surface, processing the virtual material surface in a software, extracting features from the processed virtual material surface with a software; and identifying, locating and/or classifying defects based on the features extracted from the virtual material surface, wherein processing the virtual material surface comprises transforming it into a binary image having 2 pixel values, and the features extracted therefrom feed a defect classification algorithm by which defects in the inspected material are detected identified, located and/or classified. The steps of detecting, identifying, locating or classifying defects may be performed independently, so it should be understood that the methods described herein may detect, and/or identify, and/or locate, and/or classify defects.

In a specific embodiment applicable to all above-mentioned embodiments, the light source generates a light pattern of light and shade. For example, a light source may be or a virtual light source for virtual material surfaces generated in a virtual environment. The projected light may be emitted by a light source selected from the group comprising, but not limited to, a set of tubular fluorescent lamps; or tubular LED bulbs; or a screen illuminated by a projector or laser; or an LCD, Plasma, OLED or LED display; or a set of lamps having in front of them a thin blade which alternates between translucent regions and black matte regions; or any device capable of creating a pattern of light and shade.

In specific, but non-limiting embodiments, the image is captured by an image capturing device, which may be, for example, a video and/or photographic camera, an infrared camera, or an ultraviolet camera or any array of electromagnetic sensors capable to capture an image, or a virtual image capturing device for material surfaces generated in a virtual environment. The frequency range of the electromagnetic waves emitted by the light source and captured by the image-capturing device is in the visible spectrum, however, it may be comprised in the infrared or ultraviolet spectrum.

The captured or generated images are reflected or refracted by the inspected material, in real or virtual environment. Reflected or refracted image can be understood as a result of the light reflection or distortion by a real material or virtual material surface. The light projected on the material or virtual material surface is reflected or refracted and can, therefore, be captured by a real or virtual image capturing device.

In some embodiments, the image may be generated by digitalizing a material surface with a three-dimensional digitalization device, or by creating, designing or simulating a virtual material surface in a design or modeling software, generating a virtual material surface.

In another specific embodiment applicable to all above-mentioned embodiments, the features are extracted from geometry and curvature of the binary image obtaining from the processed image.

In other specific, but non-limiting embodiments, processing the virtual material surface comprises projecting a virtually light pattern on the virtual material surface with a virtual light source and capturing the image reflected or refracted by the material with a virtual image capturing device.

In a specific, but non-limiting embodiment, a virtual material surface may be simulated in a three-dimensional computational environment and inspected using virtually simulated mirror-like reflection.

In other specific, but non-limiting embodiments, the distances and angles of measurement between the inspected material, the image capturing device and the light source are maintained standardized.

The materials referred herein may be referred to as products, parts of products, pieces and workpieces. Basically any material surface which require inspection for detecting, identifying, locating and classifying defects may be subjected to the methods described herein. More specifically, but not intending to limit the claimed scope, such materials may be vehicle bodies, chassis, glass, mirrors, bumper, lamps and other vehicle parts, which may be may be flat, curved, regular, corrugated, wavy, concave, convex, or may comprise a blend of such formats. Suitable materials for the application of the methods and systems of the present application may be opaque, reflective or translucent materials, for example, metal, ceramics, composite, glass, polymer, acrylic, crystal, among others. The materials surfaces may be may be painted or not.

In a specific embodiment, the method for automatic quality inspection suitable for reflective materials comprises capturing the image reflected by the material. In this specific but non-limiting embodiment, the captured image is the specular reflection of the inspected material.

In another specific embodiment, the method for automatic quality inspection suitable for transparent, semitransparent or translucent materials, i.e., which will allow the incident or projected light to pass through it, completely or partially transpose it, refracting or distorting the light. The method comprises capturing the image or light reflected, refracted or distorted by the material. According a non-limiting embodiment, the captured image may be an optical distortion of the light that passes through the inspected material.

The quality inspection methods described herein seek defects such as unwanted surface irregularities, waviness, dents, as well as painting and molding failures, dirt, scratches, bubbles and surface roughness, and variation of curvature of the material. Such methods may be carried out after various stages of production process, such as stamping, hemming, welding, painting or final assembly, or even before the production process, since virtual material surfaces may be inspected according to the method described herein. In one embodiment, the methods may include generating a quality inspection report based on the information obtained from the features extracted from the images, identifying, locating and/or classifying defects.

In addition to assessing distortions in the material, the methods and systems claimed herein may, for example, assess irregularities in the mold (tool or die) which has stamped it on a press, so that this mold (tool or die) can be corrected or replaced. An objective measurement of the severity of surface defects presents an important tool for the standardization of quality inspection, reporting and defect tracking processes. Furthermore, the integration of the quality inspection reports into the factory's production process allows quick decision-making on necessary corrections in the process.

In a specific, but non-limiting embodiment, image processing comprises transforming the image into a binary image, with only two possible pixel values. Such new binary image comprises, for example, a first color fringe on a second color background, such as a white color fringe on a black background.

According to another embodiment, the extracted features can be geometric characteristics of a fringe segment: the distance along the segment and the Euclidean distance between the beginning and the end of the segment. The statistics of the curvatures calculated for each segment point such as the sum of the curvatures, the mean, the variance, the standard deviation, the skewness, the kurtosis or combinations of these statistics may also be characteristic. The curvatures of the points can be used considering their signal or in module for the calculation of the characteristics. The derivative of the curvature can be used as a feature in the same way as the curvature.

In a non-limiting embodiment, illustrated in FIG. 2, the classification of the defects can be made, for example, by extraction of the center line of the white fringes, represented by the fine curves. A software calculates the regions of the curves corresponding to defects in the material and shows them as segments of curves. Similarly, the classification of the defects can also be made, for example, by the extraction of the edge line of the white fringes, i.e., the border between the white fringes and the dark background. In this case, the image processing algorithm separates the border line of each white fringe in two fine curves, side by side, by deleting part of the border line at the beginning and at the end of the white fringe. The material defects sought during inspection cause a median size ripple in the fringes obtained after image processing. Characteristics are extracted from the geometry and curvatures of the fringes that feed an algorithm that identifies, locates and/or classifies material or virtual material surface defects.

In a possible embodiment, a defect identification software capable of transforming the captured image into a set of curves, each corresponding to one of these light fringes, and identifying a variation of the pattern of these curves due to a possible defect, is used to fulfill the stage of extraction of features for the identification and classification of defects.

In a possible specific but non-limiting embodiment, characteristics calculated for each fringe segment serve as input to an artificial neural network, which has as output the classification of defects in the material.

In further embodiments, systems for automatic inspection of materials and virtual material surfaces are also described herein. Such systems may be used for performing the methods described herein.

In one embodiment, the system comprises a light source, an image capturing device and a device running a software for processing, identifying and classifying defects in the inspected material.

In another embodiment, the system comprises means for generating a virtual material surface and a device running a software for processing, identifying and classifying defects in the inspected virtual material surface.

The systems described above apply to automatic quality inspection of totally or partially reflective, transparent, semi-transparent or translucent materials.

The light source may be selected from the group comprising, but not limited to, a set of tubular fluorescent lamps; or tubular LED bulbs; or a screen illuminated by a projector or laser; or an LCD, Plasma, OLED or LED display; or a set of lamps having in front of them a blade of material which alternates between translucent regions and black matte regions; or any device capable of creating a pattern of light and shade.

In a possible embodiment, the image-capturing device may be, for example, a video and/or photographic camera, an infrared camera, or an ultraviolet camera or any array of electromagnetic sensors capable to capture an image.

According to the present application, a device capable of processing and analyzing data is used to fulfill at least the steps of image processing, extraction of features and classification of defects. Such device may be, for example, a computer, mobile device, microprocessor or any other device comprising image processing software, as well as software for identifying and classifying defects.

In a possible embodiment, the described systems are suitable for automatic quality inspection of surface of automobiles, such as car bodies, chassis, glass, mirrors, bumper, lamps and other automobile parts.

In other specific, but non-limiting embodiments, the image-capturing device and the light source are mechanically connected, forming an optical inspection system.

In other specific, but non-limiting embodiments, the distances and angles of measurement between the inspected material, the image capturing device and the light source are maintained standardized.

BRIEF DESCRIPTION OF THE DRAWINGS

FIG. 2 shows the processing sequence in a device for processing the captured image, identifying, locating and/or classifying the defects of the inspected material;

FIG. 3A depicts the full flow of the method of quality inspection of materials;

DETAILED DESCRIPTION

The methods and systems of the present application are represented by examples shown in the figures. Such examples are not mentioned to limit the scope of the claims, but rather to explain the claimed methods and systems by concrete examples, on the basis of the following description of the figures and exemplificative embodiments.

Figure 1:
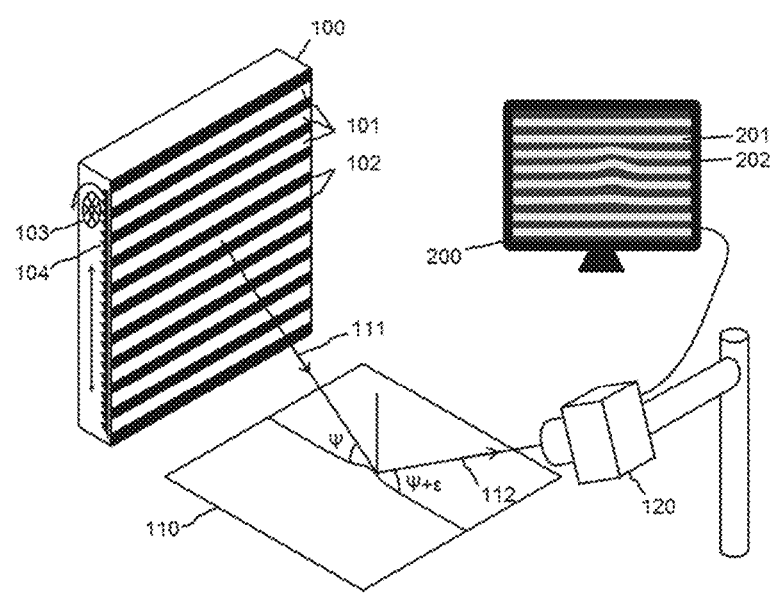
FIG. 1 shows an example of a system for automatic quality inspection of materials.

FIG. 1 presents the system for the automatic quality inspection of reflective materials. FIG. 1 shows an example of a system for automatic quality inspection of materials within the scope of the claims of the present application. The system contains a light source 100 which generates a light pattern, for example, by creating parallel lines of light 101 on a black background 102. The illumination may be created by: a set of tubular fluorescent lamps; or tubular LED bulbs;

or a screen illuminated by a projector or laser; or an LCD, Plasma, OLED or LED display; or a set of lamps having in front of them a blade of material which alternates between translucent regions and black matte regions; or any device capable of creating a pattern of light and shade.

The light rays 111 of the lights 101 are specularly reflected by the inspected material 110 as indicated by the reflected ray 112. The inspected material 110 may be metal, ceramic, glass, composite, glass, polymers, acrylics, crystals or any other type of reflective material.

The material 110 may be flat, curved, regular, corrugated, wavy, concave, convex, or may comprise a blend of such formats. An image-capturing device 120 captures the reflected rays 112. Waviness defects in the inspected material 110 change the angulation of the reflected rays 112, and thus change the image captured by the image-capturing device 120.

The image-capturing device 120 may be, for example, a video and/or photographic camera, an infrared camera, or an ultraviolet camera or any array of electromagnetic sensors capable to capture an image. The frequency range of the electromagnetic waves emitted by the light source 100 and captured by the image-capturing device 120 is in the visible spectrum, however, it may be comprised in the infrared or ultraviolet spectrum. The image captured by said image-capturing device 120 is transmitted to a device 200, capable of processing the captured image, identifying and classifying the defects.

The device 200 is a device running a software for processing, identifying and classifying defects in the inspected material, for example, a computer, mobile device, microprocessor or any other device capable of processing and analyzing data. The device 200 contains software for image processing as well as software for identification and classification of defects.

In the case of a light source 100 composed of fluorescent tubes or LED stripes, all regions of the inspected material 110 are illuminated by the lights 101 at some instant due to the movement of the light source 100 made, for example, by a rack and pinion 104 coupled to the lamp structure driven by a motor 103. The shape of the light pattern is not limited to parallel lines, in the same way that the light source 100 need not necessarily be flat. In the case of a box with lights which has in front of it a sheet of material which alternates translucent regions and black matte regions, the movement of the rack and pinion 104 could move this blade containing the lights 101 and 102 without the need to move the lamps to its bottom. Optionally, the fringes can be translated by the position variation of the inspected material or the camera. Additionally, translating, rotating or changing the light patterns can be done by changing the projected image in the case where the light source 100 is an LCD, plasma, OLED or LED display.

FIG. 2 shows the processing sequence in a device for processing the captured image, identifying, locating and/or classifying the defects of the inspected material. FIG. 2 presents the image processing sequence in the device 200 or 430. The captured image has light fringes 201 corresponding to the specular reflection of the light source 101 on the inspected material 110, or, fringes 431 corresponding to the lights that have passed through 410, as well as shade regions 202 or 432 where there was no direct incidence of light from light source 100 or 400.

This first image with light fringes 201 or 431 and shade regions 202 or 432 contains pixels with different color intensities. It is transformed into a binary image with only two possible pixel values, for example white and black. This new binary image contains white fringes 203 on a black background 204. The next step is the averaging of the white fringes 203, represented by the fine curves 205. The software calculates the regions of the curves 205 corresponding to defects in the part and shows them as segments of curves 205. Such processing steps of the binary image are performed by the device 430.

FIG. 3A depicts the full flow of the method 300 of quality inspection of materials. FIG. 3A shows the full flow of the material quality inspection method 300. Steps 301 and 302 relate to the actions illustrated in FIG. 1 or FIG. 4, while steps 303 to 312 refer to the software processes shipped in the device 200 or 430 and illustrated in FIG. 2. The method is initiated by light projection step 301 using the light source 100 or 400 which is reflected on the inspected material 110 or passes through the inspected material 410 and the image capturing 302 by the image-capturing device 120 or 420. This captured image contains light fringes 201 or 431 reflected on a darker area of material 202 or 432 where there was no direct incidence of light. The image is composed of an array of pixels, each pixel with different colors and brightness.

The software used for defect identification shall be capable of transforming the captured image into a set of curves, each corresponding to one of these fringes of light, and identifying a variation of the pattern of these curves arising from a possible defect. The image processing starts by the binarization of the image 305, i.e., the separation of the pixels belonging to the light fringes 203 from the remainder of the image, with darker tone 204. In a second moment, each fringe 203 is thinned, so which is represented by a curve with only one pixel width 205, a process known as erosion of the fringes 306. Alternatively, the curves 205 can be found by the edge detection between the light fringes 203 and dark 204 or by the edge detection between the light fringes 201 or 431 and the dark fringes 202 or 432. The edge detection can be implemented by applying various techniques, such as a gradient filter or Sobel filter. If the edge detection process does not generate a curve with unit thickness, erosion of this edge is applied to obtain a curve with a pixel width. In this case, the image processing algorithm separates the edge line of each white fringe in two fine curves, side by side, by deleting part of the edge line at the beginning and at the end of the white fringe.

Defects of materials sought during inspection cause a median size ripple in the fringes. Thus, short-wavelength (high frequency) ripples due to noise, surface roughness or quantization of the image (the scanned image has the coordinates of its points truncated to integer values of pixels) are drawn through spatial noise filters 307, for example, Gaussian spatial filters, averaging filters, low-pass filters or other filters that serve the same function. Spatial filters 307 are added to high-pass filters, which exclude high-wavelength (low-frequency) corrugations due to part geometry.

Throughout each of these curves 205, each representing a fringe, the curvature 308 is calculated. A material defect is correlated with an abrupt variation of the curvature of the fringe. Each fringe is divided into segments. The criterion of dividing the fringe into segments may simply be to divide each fringe into segments of the same pixel size. Alternatively, points of which the calculated curvature is zero may be used as dividing points of the fringe. It is also possible to consider overlap between the segments or, further, to analyze each pixel of the fringe as if it were a segment.

From the geometry and the curvatures 308, features 309 are extracted which feed a defect classification algorithm 304. The features mentioned herein may be geometric characteristics of the segment: the distance along the segment and the Euclidean distance between the beginning and the end of the segment. The statistics of the curvatures calculated for each segment point such as: sum of curvatures, mean, variance, standard deviation, skewness, kurtosis or combinations of these statistics may also be features. The curvatures of the points can be used considering their signal or their absolute value in the calculation of the feature. The derivative of the curvature can be used as a feature in the same way as the curvature. In addition, a tolerance value can be deducted from the curvatures, below which the curvatures would be disregarded in the calculation of the defects. If the distance and angle between the light source 100 or 400, material 110 or 410 and image-capturing device 120 or 420, respectively, are not fixed, these parameters can also be added as inputs of the defect classification algorithm 304. Features of the segments in the fringe of the analyzed segment, as well as in its neighboring fringes, establishing a region of context. This context can provide information if the analyzed segment has features with values close to its surroundings or if they deviate from them. Extracted features of the context region may be, for example, distances or statistics of the calculated curvatures or derivative of curvatures, such as sum of curvatures, mean, variance, standard deviation, skewness, kurtosis or combinations of these statistics. The features of the context can be weighted by the distance to the analyzed segment. The context can be subdivided into regions, generating different features that will serve as inputs to the classification algorithm 310.

Figure 5:
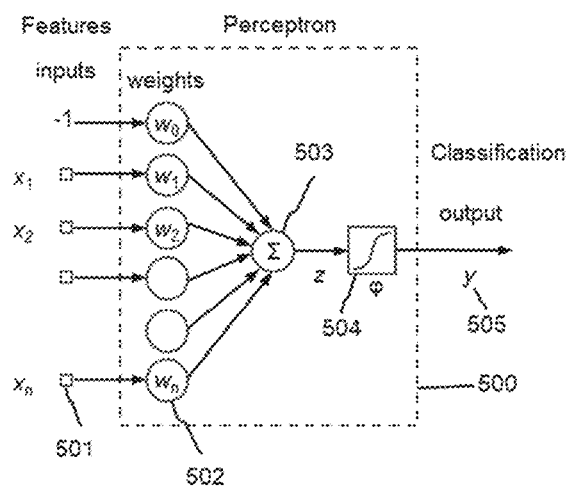
FIG. 5 illustrates a possible implementation of the artificial neural network using single layer perceptrons.
Figure 6:
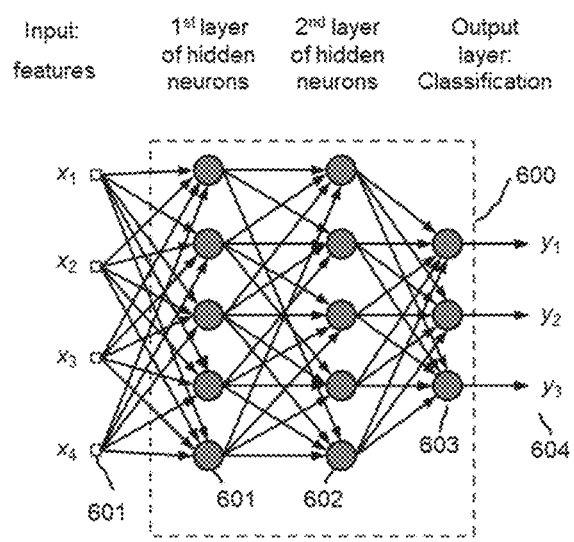
FIG. 6 illustrates a possible implementation of the artificial neural network with multiple layer perceptrons.

The calculated features 309 for each fringe segment serve as input to an artificial neural network 310, whose outputs are the classification of defects 311. A possible implementation of the artificial neural network is through perceptrons with a layer or multiple layers as shown in FIG. 5 and FIG. 6. The classification 310 may be implemented, for example, by single-layer perceptrons, multilayer perceptrons, decision trees, convolutional neural networks, or combinations of these algorithms. Details on artificial neural networks are presented in the book Neural Networks and Learning Machines (Haykin, 2009). The synaptic weights of the artificial neural network are trained through a set of images with identified defects, that is, through a supervised training carried out in the calibration phase of the software. After the training of this network, it is able to classify similar objects with respect to the identification and classification of defects of materials.

In an additional exemplificative embodiment, segments 206 classified as defect 311 are overlayered on the original image 201-202 or 431-432 in the form of a report to the quality inspector.

In another additional exemplificative embodiment, it is possible to capture several images, each with the set of fringes slightly moved relative to the previous image, so that all points of the piece, or material, are illuminated in some image. The processing of these images following steps 301-312 provides a set of defect segments found for each image, which can be fused to a single image, so that a report is generated with the defects shown as colored areas.

According to exemplificative embodiments, in order to ensure that any defective region in the part is properly illuminated and that the light pattern evidences the defects, in addition to the translation of the light patterns, the light patterns can be rotated between each other, enlarged in size, or change shape. Additionally, a single image-capturing device 120 may not capture the entire inspection area in a single image. Therefore, it is foreseeable to use a set of image-capturing device 120, or that the focus of vision of the device is moved relative to the inspected material 110. The light source 100, the inspected material 110, and the image-capturing device 120 are movable relative to each other.

According to other exemplificative embodiments, surface defects may have different sizes, for example, a low dent may be 5 millimeters wide, while a waviness may be 10 centimeters wide. Also, discrete curvature calculation algorithms, for example, may be focused on a more appropriate derivation step for a smaller or larger dimensional scale. This derivation step can be changed by changing the number of pixels considered in the derivation or even the resolution of the photographed image in pixels per millimeter. In order to be able to identify and classify defects of multiple sizes, it is possible to create a system that analyzes a multiple set of dimensional scales independently, i.e., a multi-scale classifier.

Figure 3B:
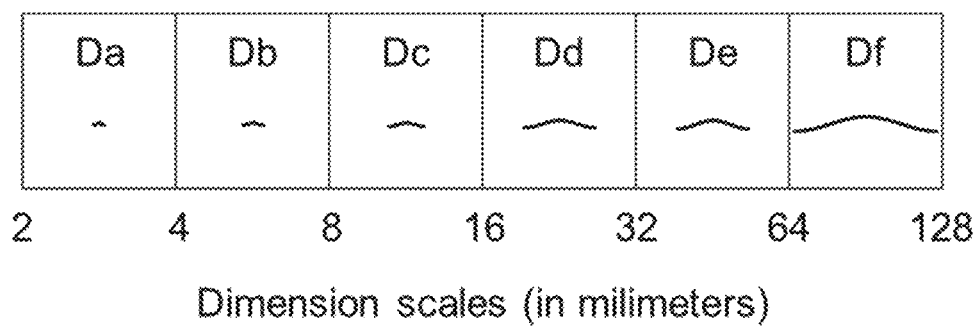
FIG. 3B illustrates a possible spectrum of the diameter of the defects that may be found in the inspected material.

FIG. 3B illustrates a possible spectrum of the diameter of the defects that may be found in the inspected material. The dimensional spectrum is divided in several ranges considering the diameter of the sought defects, for example, Da for defects with diameter from 2 to 4 millimeters, Db from 4 to 8 millimeters, Dc from 8 to 16 millimeters, Dd from 16 to 32 millimeters, De from 32 to 64 millimeters, and Df from 64 to 128 millimeters. The number of ranges and the limits of each range in FIG. 3B are illustrative and may be changed. Each dimensional scale is represented by the center of the respective dimensional range. Thus, each dimensional scale would have an independent and tuned set of spatial filtering 307, calculation of curvatures 308, extraction of features 309, and classifier 310. The classifier 310 in each dimensional scale may be implemented, for example, by single-layer perceptrons, multilayer perceptrons, decision trees, convolutional neural networks, or combinations of these algorithms.

In another embodiment, the multi-scale classifier 311 may overlay the visual information of all the classifiers 310 and shows all the defect segments 206 of each scale in a consolidated inspection report 312. The color or shape of the defect segments 206 can be different for each dimensional scale or equal for all dimensional scales. In a second possible embodiment, an independent set of inspection reports 312 is generated, each one focused in one or more dimensional scales. In a third possible embodiment, the information of all the dimensional scales or part of them is used as input of a new multi-scale classifier 311 in order to generate a consolidated inspection report 312. The new classifier 311 may use as input the defects identified and classified in each scale, the features extracted in each scale, and the dimensional scales. The new classifier 311 may be implemented, for example, by single-layer perceptrons, multilayer perceptrons, decision trees, convolutional neural networks, or combinations of these algorithms.

Figure 4:
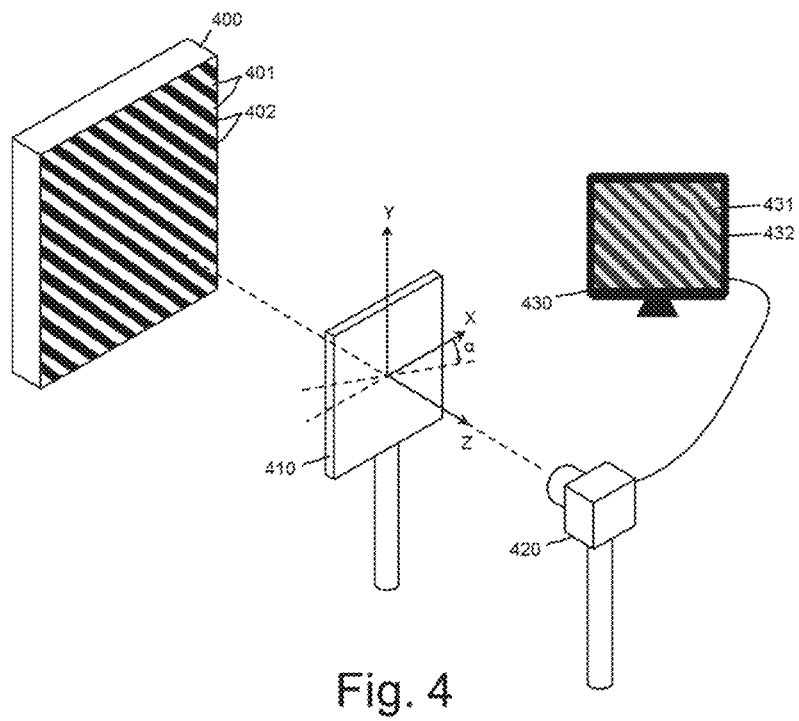
FIG. 4 shows a possible embodiment consisting of a system for the automatic inspection of optical distortion quality in translucent, transparent, semitransparent materials, or any material that distorts light incident on it.

FIG. 4 shows a possible embodiment consisting of a system for the automatic inspection of optical distortion quality in translucent, transparent, semitransparent materials, or any material that distorts light incident on it. FIG. 4 shows another possible embodiment which consists of a system for the automatic quality inspection of optical distortion in translucent, transparent or semitransparent materials. The inspected material 410 may be glass, crystal, acrylic or any other type of material which exhibits transparency. The material 410 may be flat or curved. The inspection system contains a light source 400 which generates a light pattern, for example by creating parallel lines of light 401 on a black background 402. The illumination may be created by: a set of tubular fluorescent lamps; or tubular LED bulbs; or a screen illuminated by a projector or laser; or an LCD, Plasma, OLED or LED display; or a set of lamps having in front of them a blade of material which alternates between translucent regions and black matte regions; or any device capable of creating a pattern of light and shade.

The light projected by the light source 401 passes through the inspected material 410 and are refracted due to the refractive index of the material 410. An image-capturing device 420 captures the refracted light 401. The image-capturing device 420 may be, for example, a video and/or photographic camera, an infrared camera, an ultraviolet camera or any array of electromagnetic sensors capable of capturing an image. The frequency range of the electromagnetic waves emitted by the light source 400 and captured by the image-capturing device 420 is in the visible spectrum, however, it may be comprised in the infrared or ultraviolet spectrum. The image captured by said image-capturing device 420 is transmitted to a device 430 capable of processing the captured image, identifying and classifying the defects. The device 430 is, for example, a computer, mobile device, microprocessor or any other device capable of processing and analyzing data.

Variations in the refraction index, thickness, or shape along the material 410 cause waviness in the light stripes 431 and dark stripes patterns 432 captured by the image-capturing device 420 and are sent to device 430. The device 430 contains software for image processing as well as the classification of optical distortion defects, as described in FIG. 2 and FIG. 3A.

In the case of material 410 being a flat glass, FIG. 4 presents a form of automation of the level measurement of optical distortion due to the variation of the refractive index throughout the part, replacing the subjective verification currently performed in the glass manufacturing industry which is the visual inspection by a human inspector. Still, in case material 410 is a flat glass, a possible implementation of the FIG. 4 system follows the dimensions of the Brazilian float glass inspection standard (ABNT NBR NM 294, 2004): the distance between the light source 400 and the inspected material 410 is 4.5 meters; the distance between the inspected material 410 and the image-capturing device 420 is 4.5 meters; the light source 400 has light stripes 25 mm wide and dark 25 mm wide; and, for example, the screen 410 consists of a translucent white background crossed by black parallel bands and backlight with fluorescent lamps. Considering that the part may have a rotation of an angle α in the XZ plane, it is expected that the measurement of the optical distortion defect level due to variation of the refractive index throughout the part is minimal at the angle α null and increases as α rotation approaches 90 degrees (or π/2 radians). The quality of the float glass is evaluated by the angle α from which the distortion of the refracted stripes 431 and 432 reaches the quality tolerance. The processing and calculation of the distortion follows steps 301-312. The main indication of distortion defect is a set of neighboring points with high curvature in a stripe. In the case of a striation, ream, draw line, or stretch mark in a glass, this distortion is perceived in several fringes, in a same vertical line along the glass, in the direction that it left the melting furnace.

FIG. 5 illustrates a possible implementation of the artificial neural network using single layer perceptrons. FIG. 5 illustrates a possible implementation of the artificial neural network with only one neuron 500 named perceptron, wherein the features 501 named x1, x2, . . . xn calculated at 309 are multiplied by synaptic weights 502 called w0, w1, . . . wn, summed in the operation 503 and submitted to the activation function 504, generating the result of the defect classification 505.

FIG. 6 illustrates a possible implementation of the artificial neural network with multiple layer perceptrons. FIG. 6 presents an example of an artificial neural network 600 with multiple layers 601, 602 and 603 which interact to form the defect classification 604, wherein each neuron in these layers is represented by a circle and has an internal structure with synaptic weights similar to structure 500. The number of inputs, outputs, neurons and layers can be changed depending on the extracted features in 309, classes of defects and complexity desired.

Figure 7A:
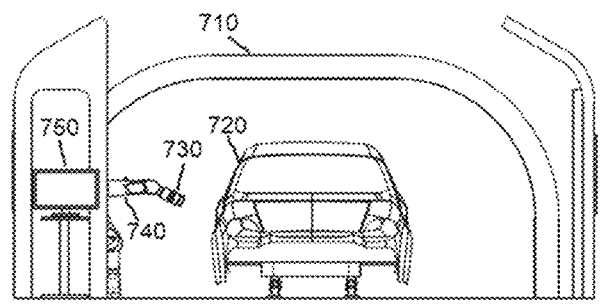
FIGS. 7A and 7B show possible embodiments in which the inspected material is an automotive body.
Figure 7B:
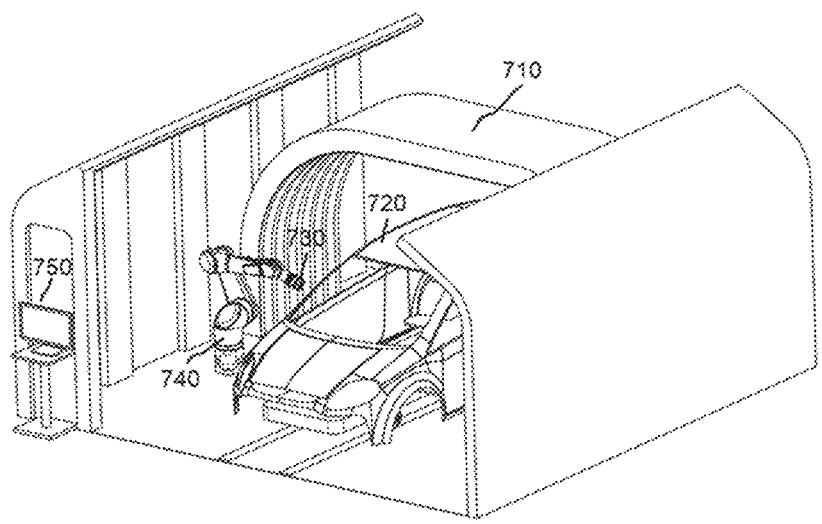

FIG. 7A and FIG. 7B show a possible embodiment in which the inspected material 110 is an automotive body 720, the light source 100 is in the shape of a curved portal with illumination in its inner part, the image-capturing device 120 is comprised of at least one camera 730 and the software processing device 200 is comprised of a computer 750. FIG. 7A and FIG. 7B represent an inspection cell, comprising a system where the inspected material 110 is an automotive body 720, the light source 100 is in the shape of a the curved portal 710 with illumination in its inner part, the image-capturing device 120 is comprised of at least one camera 730 and the software-processing device 200 is comprised of a computer 750. The image-capturing device can be fixed or mobile, for example using a robotic arm 740.

Figure 8A:
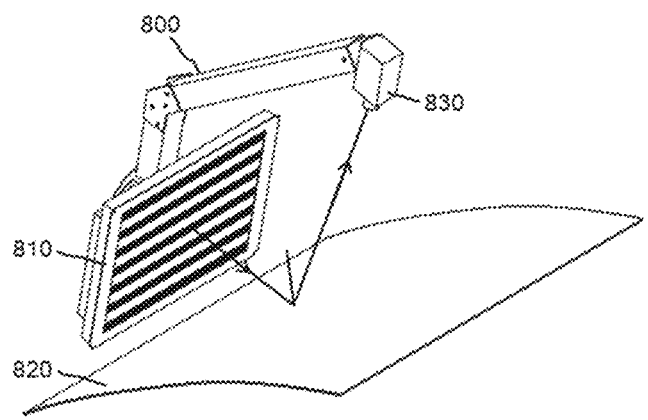
FIG. 8A shows another possible embodiment, which is a system for automatic quality inspection of surfaces

FIG. 8A shows another possible embodiment, which is a system for automatic quality inspection of surfaces, comprising one or more optical inspection systems 800, each comprising an image-capturing device and a lighting system mechanically connected thereto. The light source 100 may be in the form of a display 810, consisting of one or more LCD, plasma, OLED or LED displays, a set of lamps, or any device capable of creating a pattern of light and shades, so that patterns of light created are reflected on the inspected material 110, represented, for example, by an automotive part or body 820. The material 820 to be inspected may be reflective, i.e., reflects the light incident, translucent, transparent or semitransparent, and reflect, refracts or distort the incident light. In both cases light reflected by or distorted through the material may be captured by an image-capturing device 120, for example, but not limited to, a camera 830. Suitable materials for the application of the methods and systems of the present application may be reflective or translucent materials, for example, metal, ceramics, composite, glass, polymer, acrylic, crystal, among others, basically through the steps of: capturing images reflected by or distorted through the inspected material; processing the captured images; and identifying and classifying of defects in the inspected material using artificial intelligence techniques.

The software processing device 200 is comprised of a computer device 850. Computer device 850 may also be a mobile device, microprocessor or any other device capable of processing and analyzing data. The device is used for processing the captured images, identifying and classifying the defects of the inspected material, and creating inspection report of the inspected material. The inspection report evidencing the defects of the inspected materials may be shown in one or more monitors as depicted in 750, 860 and 960. The report may also be shown in a LED, plasma, OLED or LED display, a projection on a screen, augmented reality glasses or any device capable of showing a two-dimensional or three-dimensional visualization of the inspection report. All data and pictures generated by the equipment and software described in this patent application can be stored or sent to other systems for statistical analysis of the process, for documentation or for the improvement of methods and systems for the automatic inspection of material quality.

Figure 8B:
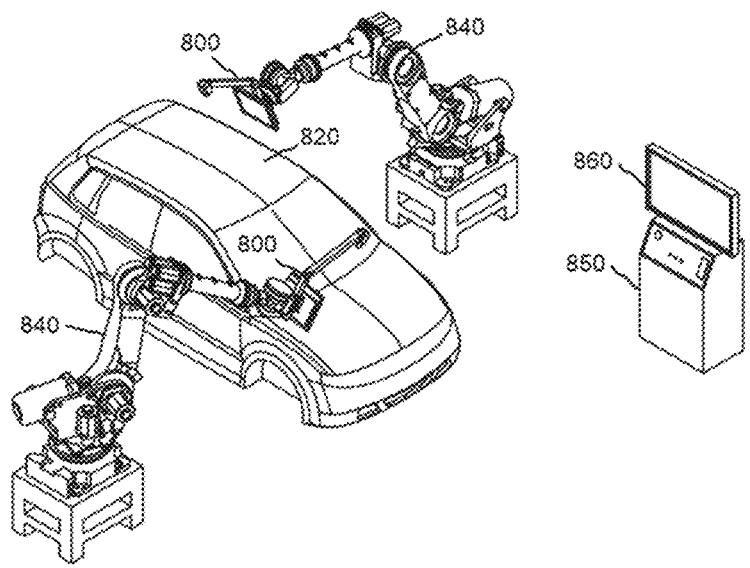
FIG. 8B shows that the optical inspection system may be fixed or movable, for example, by using a robotic arm.

According to exemplificative embodiments, the optical inspection system 800 may be fixed or movable, for example, by using a robotic arm 840, as shown in FIG. 8B. The distances and angles of measurement between the inspected material 820, the imaging device 830 and the light source 810 are maintained standardized with the aid of the robotic arm 840, together with the mechanical structure of the optical system 800 which creates a mechanical connection between the image-capturing device 830 and the display 810. This standardization is necessary so that the reflection of the light source 810 is correctly captured by the device 830 for the correct comparison and interpretation of the acquired images and to meet the optical requirements of the system, for example, maintaining the inspected material 820 in focus at a position within the depth of field of the lens system of the image-capturing device 830. If part 820 is larger in size than the capture area of the image-capturing system 830, optical inspection system 800 is moved to multiple positions so as to capture images in various regions of the inspected material 820, maintaining the standardized distances and angles with the aid of the robotic arm 840, which makes a movement path compatible with this standardization. After processing the images, identifying and classifying the defects using the computer device 850 in each of the inspected regions, the complete part inspection report is created by matching the location of the defects in the images captured in each of the regions with the location of the defects in the part as a whole, represented by its virtual design in the computer, using for this the reference of the position of the robotic arm 840 when the images were captured. The use of a robotic arm 840 positioning the 800 optical inspection system gives flexibility to the optical system 800 to work for capturing images of different products and geometries by programing a new trajectory to the robotic arm 840. The inspection report evidencing the defects of the part 820 is shown, for example, in one or more monitors 860, which may be close to the optical system 800 or in another location, for example, where the quality information is useful to correct defects in the inspected materials 820.

In another example embodiment, the image-capturing system 830 is composed of a first image-capturing system, for example, wherein one or more cameras are used for the inspection of unwanted waviness and dents with a diameter in the order of centimeters, while a second image-capturing system inspects paint defects in the order of millimeters, such as dirt, scratches, bubbles and surface roughness. Each image-capturing system is composed by one or more video and/or photographic camera, infrared camera, or an ultraviolet camera or any array of electromagnetic sensors capable to capture an image. The optical inspection system 800 shares the same light source 810 for both inspection functions, and reflects light patterns on the inspected material. Each light pattern crested by the light source 810 may serve only one or both image-capturing systems. Thus, for the inspection of waviness or dents, for example, the first image-capturing system has lenses with focus on the reflection, i.e., the distance between the image-capturing system 830 and the part 820 added to the distance between the part 820 and light source 810. On the other hand, the second image-capturing system, has lenses focused on the distance between it and the part 820, for a better interpretation, for example, of paint defects such as dirt or bubbles. In images captured by the first image-capturing system, defects are assessed through the distortion caused in the course of the fringe, while images captured by the second image-capturing system, paint defects cause internal degradation of the fringes and degradation at the edges of the fringes. In this second system, bubbles or fragments in the paint can be found by processing the image of the light and dark patterns made by the light source 810 reflected on the part 820 and by implementing a software in computer device 850 for checking the appearance of dark spots within the clear patterns and clear points where there should be no light reflection. Additionally, the paint roughness of the part 820 can also be assessed by the ripple and degradation of the transition edges between the light and dark patterns in the captured image.

Additionally, the three-dimensional virtual material surface of the material be inspected may be useful as input of the methods and systems disclosed herein. The three-dimensional surface may be used in order to plan the region of interest for the images captured and the positioning of the inspection equipment 100, 120, 800, 910, 930 and the trajectories of the robotic arms 740, 840, and 940. Also, the three-dimensional design of the part to be inspected can present geometric ripples, folds and curvature that may be confused with defects. Therefore the curvatures and ripples of the part design can be used as an input of the algorithms 307-311 and it can be discounted from the features 309 extracted from the captured images. In the same way, the three-dimensional design of part can be used to create image masks or to tune the parameters of the classifiers.

Figure 9A:
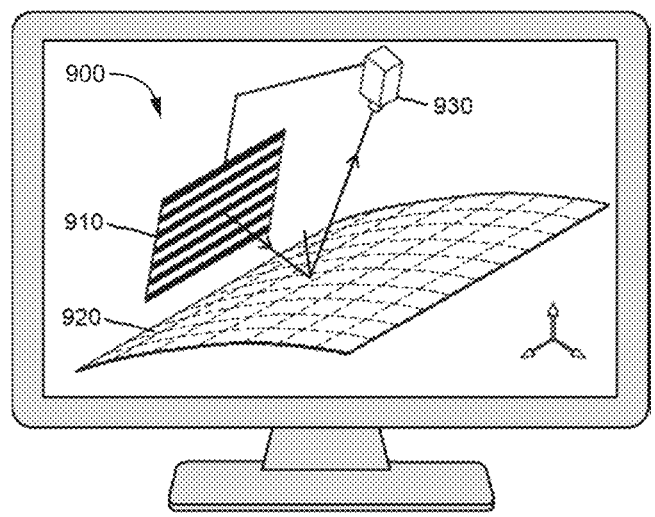
FIG. 9A illustrates a system for automatic quality inspection of virtual material surfaces in a software-simulated three-dimensional simulation computer environment in the form of one or more optical inspection systems.

In another exemplificative embodiment, illustrated in FIG. 9A, there is a system for automatic quality inspection of virtual material surfaces in a software-simulated three-dimensional simulation computer environment in the form of one or more optical inspection systems 900. The material 920 being inspected may be reflective (i.e., light reflecting) or translucent (which is permeable but distorting lights). The phenomena of reflection or refraction of light are also simulated in a virtual environment. In both cases, the light reflected by or distorted through the material may be captured by an image-capturing device 120, for example, but not limited to, a camera 930, also simulated in a virtual environment. The positioning considering distances and angles between the imaging of the virtual device 930, the virtual light source 910 and the inspected virtual part 920 are kept fixed in the same way as the device 800 of FIG. 8A.

The inspected virtual material surface 920 simulated in three-dimensional computing environment is represented by a three-dimensional volume or a three-dimensional surface. In one possible embodiment, the virtual material surface can be generated by computer-aided design software (CAD), so that the system inspects the design of a part, in search of imperfections in this project. In a second possible embodiment, the virtual material surface can be generated as a result of the simulation of the manufacture of materials, for example, by software that simulates the stamping, cutting, forming and springback in the manufacture of metal parts or in the injection of plastic parts. Additionally, in the case of an automotive part, the system inspects the car design 920 to search for unwanted undulations in order to correct any problems still in the car design phase, avoiding the production costs of a real part and mechanical tools to discover this problem during manufacture.

Figure 9B:
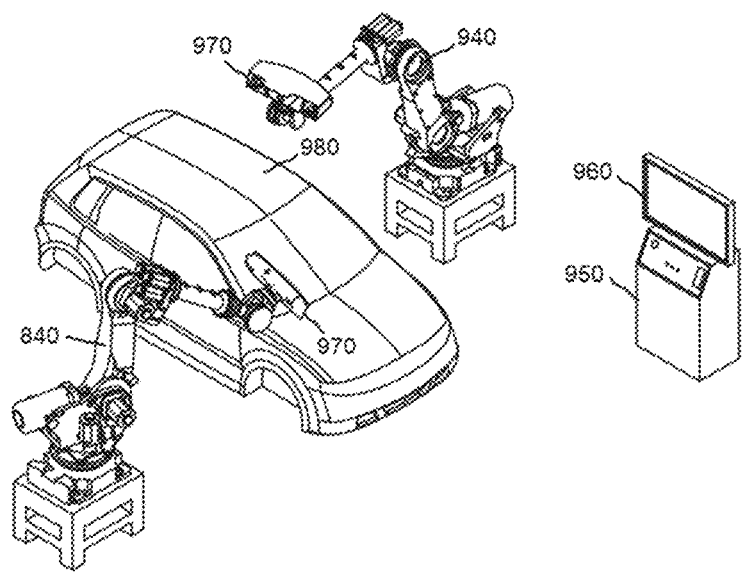
FIG. 9B illustrates that the virtual material surface may be generated by scanning, i.e., as a result of the three-dimensional digitalization of a real material surface through a scanner.

In another embodiment, the virtual material surface 920 may be generated by scanning, i.e., as a result of the three-dimensional digitalization of a real material surface 980 through a scanner 970, as shown in FIG. 9B. In this case, although the surface scanning usually requires a matte surface with low specular reflection, the virtual material surface 920 generated in a three-dimensional computational environment will be inspected using virtually simulated mirror-like reflection. In the case of an unpainted automotive part, an unpainted car body or a matte plastic part, this method of inspection allows the virtual environment to evaluate how the reflective behavior of this surface would be and to anticipate the inspection of undesirable waviness that will be evident to human eyes only after painting, application of clearcoat or similar surface treatment that makes the surface reflective. When anticipating surface quality inspection with the unpainted surface still, with a system that does not require physical contact between the measurement system and the inspected material, and without application to the part of, for example, reflective oil, it becomes evident the technical superiority of this inspection method which allows its application on the assembly line of automobiles. The inspection report evidencing the defects of the part 980 is shown, for example, in one or more monitors 960 associated with computer 950, which may be close to the optical system 970 or in another location, for example, where the quality information is useful to correct defects in the inspected materials 980

In some exemplificative embodiments, scanner 970 is an equipment capable of performing the acquisition of topographic information from a real material surface and digitizing this information in the form of a three-dimensional point mesh in a software environment. Through this mesh of points a virtual material surface is recreated, which is analyzed by the system proposed in FIG. 9A. The scanner 970 must have sufficient accuracy and suitable resolution for the size and depth of the inspected defects. In the case of waviness and dents in automotive bodies, the defects have diameter in the order of centimeters and depths of tenths of a millimeter. If the actual part 980 has a surface larger than the capture area of the scanner 970, the scanner 970 is moved to multiple positions so as to digitalize surfaces in various regions of the inspected material with the aid of the robotic arm 940. The position and orientation of the robotic arm 840 is used for the subsequent location of each of the scans in the simulated three-dimensional space so that application of markers on the inspected material 980 are not required for the three-dimensional stitching of the digitalized surfaces. Since there are small overlaps between the surfaces acquired by the scanner, distance minimization algorithms in virtual environment can be used to validate and adjust the alignment between the scanned pieces of the inspected material.

In a possible embodiment, the three-dimensional scanning of surfaces with areas in the order of units of square meters is the use of scanners with the triangulation principle. In this type of scanner, the lighting is applied on the inspected material by a laser or a light projector. Additionally, in this type of scanner, images of the part are captured by one or more sensors such as cameras or other image-capturing device. The sensor and light projector are angled, forming a sensor-part-projector triangle, so that the depth changes in the inspected material are translated into lateral displacement of the light spot on the image captured by the sensor. Examples of scanners that use triangulation are laser point scanners, laser line scanners, and structured light scanners. The latter use a projector to send light patterns on the part and use algorithms such as Gray code or phase-shift to minimize the number of captured images required for surface scanning.

In an embodiment the methods and systems described in the present application are for the automatic quality inspection of automobile surfaces such as car bodies, chassis, glass, mirrors, bumper, lamps and other automobile parts. However, the examples described in this report are not limiting, allowing a person skilled in the art to change some aspects or components of the methods and systems described, equivalent to the solutions described herein, without departing from the scope claimed herein.

What is claimed is:

1. A method for automatic inspection of materials, the method comprising the steps of:
    projecting a light pattern on a material to be inspected with a light source;
    capturing an image reflected or refracted by the material with an image capturing device;
    processing the captured image in a software;
    extracting features from the processed image with a software; and
    identifying, locating and/or classifying defects based on the features extracted from the image,
    wherein the light pattern projected on the material is a pattern of light and shade;
    the captured image comprises light fringes and shade regions corresponding to the light pattern of the inspected material;
    the processing comprises the steps of (i) transforming the image into a binary image having 2 pixel values and (ii) separating the pixels belonging to the light fringes and shade regions; and
    the defects are identified, located and/or classified by a defect classification algorithm based on distortions in the light fringes caused by the defects.

2. The method of claim 1, wherein the features are extracted from geometry and curvature of the light fringes.

3. The method of claim 1 further comprising generating an inspection report.

4. A system for performing a method of automatic inspection of materials as described in claim 1, comprising a light source, an image capturing device and a device running a software for processing, identifying and classifying defects in the inspected material.

5. The system of claim 4 wherein the light source generates a light pattern of light and shade.

6. The system of claim 4 wherein the image capturing device is any device comprising an array of electromagnetic sensors capable of capturing an image.

7. The system of claim 4 wherein the device running the software is a computer, a mobile device, a microprocessor or any other device capable of processing and analyzing data.

8. The system of claim 4, wherein the image capturing device and the light source are mechanically connected, forming an optical inspection system.

9. The system of claim 8, wherein the distances and angles of measurement between the inspected material, the image capturing device and the light source are maintained standardized.

10. A method for automatic inspection of a virtual material surface, the method comprising the steps of:
    generating a virtual material surface;
    processing the virtual material surface in a software;
    extracting features from the processed virtual material surface with a software; and
    identifying, locating and/or classifying defects based on the features extracted from the virtual material surface,
    wherein the virtual material surface is a three-dimensional surface;

the processing comprises the steps of (i) transforming images into a binary image having 2 pixel values and (ii) separating the pixels belonging to the light fringes and shade regions; and the defects are identified, located and/or classified by a defect classification algorithm based on distortions in the light fringes caused by the defects.

11. The method of claim 10, wherein processing the virtual material surface comprises projecting a virtually light pattern on the virtual material surface with a virtual light source and capturing the image reflected or refracted by the material with a virtual image capturing device.

12. The method of claim 10, wherein the virtual material surface is generated in or by a software or as a result of a three-dimensional digitalization of a real material surface.

13. The method of claim 10, wherein the generated virtual material surface is simulated in a three-dimensional computational environment and inspected using virtually simulated mirror-like reflection.

14. The method of claim 10, wherein the features are extracted from geometry and curvature of the binary image.

15. The method of claim 10 further comprising locating the defect and generating a defect report.

16. A system for performing a method of automatic inspection of a virtual material surface as described in claim 10, comprising means for generating a virtual material surface and a device running a software for processing, identifying and classifying defects in the inspected virtual material surface.

17. The system of claim 16, wherein the means for generating a virtual material surface is a software for designing or simulating virtual material surfaces.

18. The system of claim 16, wherein the means for generating a virtual material surface is a three-dimensional digitalization device for obtaining virtual material surfaces from real material surfaces.

19. The system of claim 18, wherein the distances and angles of measurement between the inspected virtual material and the three-dimensional digitalization device is maintained standardized.

20. The system of claim 16, wherein the device running the software is a computer, a mobile device, a microprocessor or any other device capable of processing and analyzing data.

* * * * *